US006819761B1

(12) United States Patent
Williams

(10) Patent No.: US 6,819,761 B1
(45) Date of Patent: Nov. 16, 2004

(54) PROGRAMMABLE CONSTANT CURRENT "OFF HOOK" CIRCUIT

(75) Inventor: H. Ross Williams, Madison, AL (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 09/397,414

(22) Filed: Sep. 16, 1999

(51) Int. Cl.[7] .......................... H04M 9/00; H04M 1/00; H04M 11/00

(52) U.S. Cl. .............................. 379/399.01; 379/93.05; 379/387.01; 379/391; 379/413.02

(58) Field of Search ....................... 379/399.01–399.02, 379/402, 413, 413.02, 414, 387.01, 391, 394, 398, 377–378, 93.05, 93.36

(56) References Cited

U.S. PATENT DOCUMENTS

| | | | | |
|---|---|---|---|---|
| 4,056,691 A | * | 11/1977 | Freimanis et al. ............. | 179/18 |
| 4,203,006 A | | 5/1980 | Mascia | |
| 4,281,219 A | | 7/1981 | Cowpland et al. | |
| 4,679,232 A | * | 7/1987 | Brooks et al. ............... | 379/413 |
| 4,686,700 A | | 8/1987 | Perry ........................... | 379/183 |
| 4,704,670 A | * | 11/1987 | Gradl et al. ................... | 363/21 |
| 4,803,719 A | * | 2/1989 | Ulrich .......................... | 379/399 |
| 4,803,721 A | * | 2/1989 | Schingh ....................... | 379/399 |
| 4,827,503 A | * | 5/1989 | Takato et al. ........... | 379/373.01 |
| 4,958,371 A | * | 9/1990 | Damoci et al. .............. | 379/377 |
| 5,369,687 A | | 11/1994 | Farkas .......................... | 379/98 |
| 5,428,730 A | | 6/1995 | Baker et al. ................. | 395/154 |
| 5,454,031 A | * | 9/1995 | Gray et al. ............. | 379/106.11 |
| 5,625,679 A | | 4/1997 | Gutzmer ....................... | 379/99 |
| 5,680,323 A | | 10/1997 | Barnard .................. | 364/514 A |
| 5,737,706 A | * | 4/1998 | Seazholtz et al. ............ | 455/466 |
| 5,790,653 A | | 8/1998 | Fairbanks ..................... | 379/372 |
| 5,790,656 A | * | 8/1998 | Rahamim et al. ............ | 379/399 |
| 5,796,789 A | | 8/1998 | Eftechiou ...................... | 379/35 |
| 5,881,129 A | * | 3/1999 | Chen et al. ..................... | 379/5 |
| 6,121,263 A | * | 9/2000 | Brown ........................ | 514/243 |
| 6,275,583 B1 | * | 8/2001 | Derby et al. ................. | 379/412 |
| 6,292,544 B1 | * | 9/2001 | Detering et al. .......... | 379/88.12 |
| 6,377,681 B1 | * | 4/2002 | Bremner ...................... | 379/394 |
| 6,538,510 B1 | * | 3/2003 | Amrany et al. .............. | 330/252 |

OTHER PUBLICATIONS

*EIA/TIA–496–A Interface between Data Circuit–Terminating Equipment (DCE) and the Public Switched Telephone Network (PSTN)*, Electronic Industries Association, (Sep. 28, 1999).

* cited by examiner

*Primary Examiner*—Binh K. Tieu
(74) *Attorney, Agent, or Firm*—Farjami & Farjami LLP

(57) ABSTRACT

An apparatus and method for interfacing a communication device, such as a Customer Premise Equipment (CPE) to different telephone networks. The telephone networks typically provide a voltage of 48 volts to the CPE. However, this DC voltage tends to fluctuate. Furthermore, the impedances of the telephone network varies. The apparatus provides a constant current to the communication device while coupled to different telephone networks. Since most communication devices use amplitude modulations for transmitting data, a constant DC biasing current is desired. The apparatus can sense load impedances of the telephone networks, and dynamically adjust the current source so that DC biasing currents remain relatively constant. The apparatus is coupled to the telephone network so that communication between the communication device and the telephone network is optimized.

36 Claims, 5 Drawing Sheets

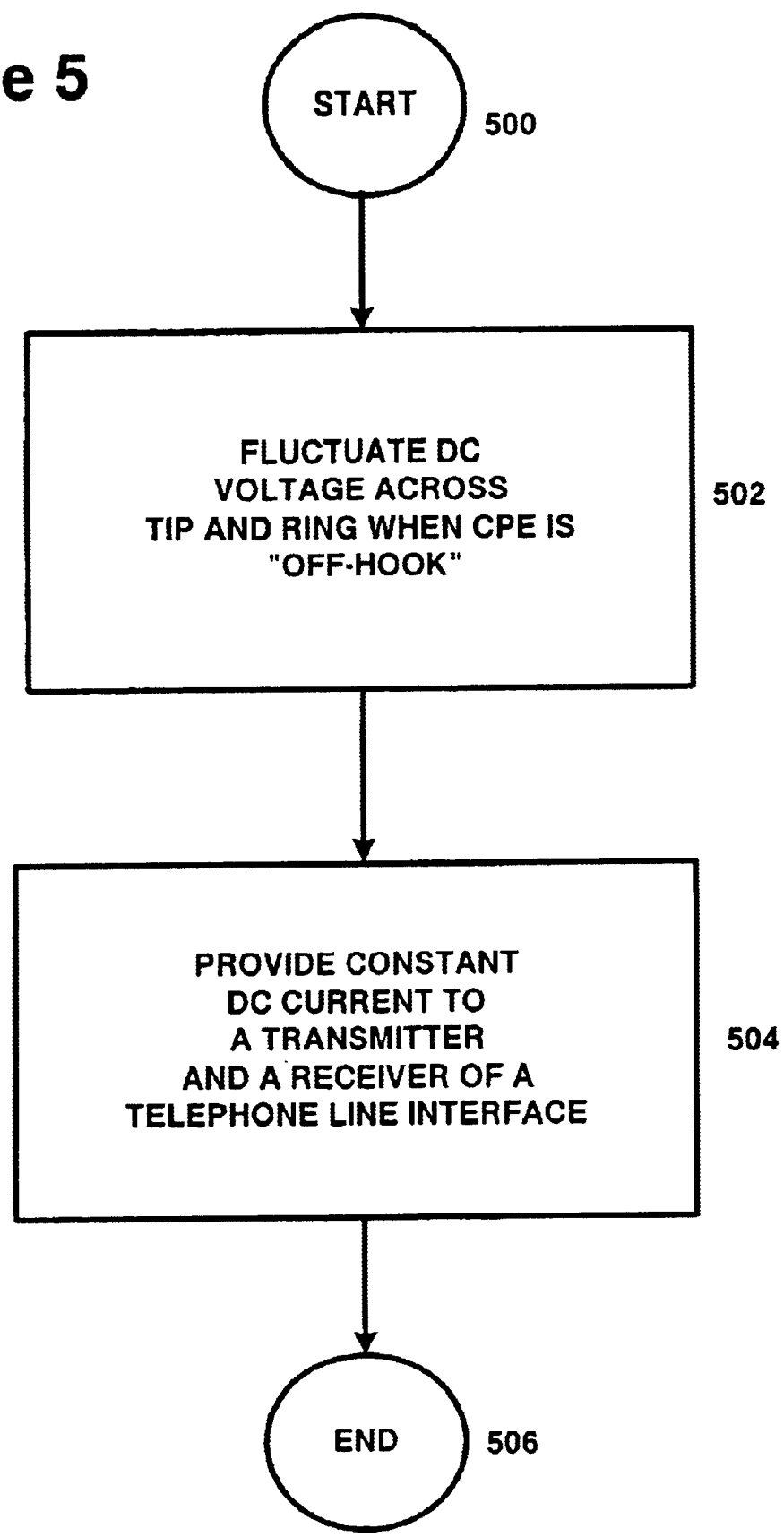

PROGRAMMABLE CONSTANT CURRENT "OFF HOOK" CIRCUIT

BACKGROUND

1. Field of the Invention

The present invention relates to an apparatus for communication devices, in particular an apparatus for providing a constant current while the device is in the "off-hook" state.

2. Description of the Related Art

Modems are communications devices which employ digital processing techniques to transmit data over a band-limited communications channel, such as the Public Switched Telephone Network (PSTN). Generally, to transmit data over the PSTN, a modem modulates the binary data and then transmits the data over the band-limited communications channel. A receiving modem is coupled to the band-limited communications channel, and receives the binary data and demodulates the binary data Generally, in order for the modem to effectively communicate over the PSTN, such as a Plain Old Telephone Service (POTS) line, the modem's "off-hook" electrical interface should meet a telephone standard, such as EIA/TIA-496-A. The standard includes the necessary electrical interface criteria for the modem, including "off-hook" impedance, loop current, and dial tone levels.

"Off-hook" refers to a state of the communication device, such as when the communication link between the device and the PSTN is enabled for voice, data communication or network signaling. The term "off-book" is derived from the original telephone usage in which they refer to the position of the hand set with respect to the cradle of the telephone. An improper interface between the device and POTS line may result in lost data. In addition, a variety of other performance criteria, such as connection speed of the device, may be adversely affected by an improperly interfaced device. Furthermore, an improper device interface may degrade POTS network performance.

Present modem designs incorporate a fixed valued resistor or a resistor/transistor element as a current element when the modem is in the "off-hook" state. This off-hook impedance is placed in series with the telephone line impedance. Since most modems use an amplitude modulation scheme for data transmission, DC biasing currents can affect modem communication. Furthermore, because telephone line impedance can vary, data transmission can be affected by the present modem designs utilizing a fixed-value resistor design.

SUMMARY OF THE INVENTION

Briefly, one feature of the invention provides a constant current to an Analog Front End (AFE) of a communication device while the device is in the off-hook state. The apparatus provides the necessary circuitry for connecting a communications device, such as a modem, with a telephone network, such a Plain Old Telephone Service (POTS) network. When the communication device is in an off-hook state, the apparatus provides a constant DC current to the telephone line. Transmission and reception and of data over the telephone network is optimized when the average DC biasing current of a data signal is about 30 ma. The apparatus generally maintains an average current of about 30 ma regardless of the loading of the telephone network line. Since most communication devices use current modulation for data transmission, the present invention provides a constant DC biasing current for such data transmission.

BRIEF DESCRIPTION OF THE DRAWINGS

A better understanding of the present invention can be obtained when the following detailed description of the preferred embodiment is considered in conjunction with the following drawings, in which:

FIG. 5 is a flow chart of a method of optimizing a communication device coupled to a telephone network.

DETAILED DESCRIPTION OF PREFERRED EMBODIMENT

Figure 1:
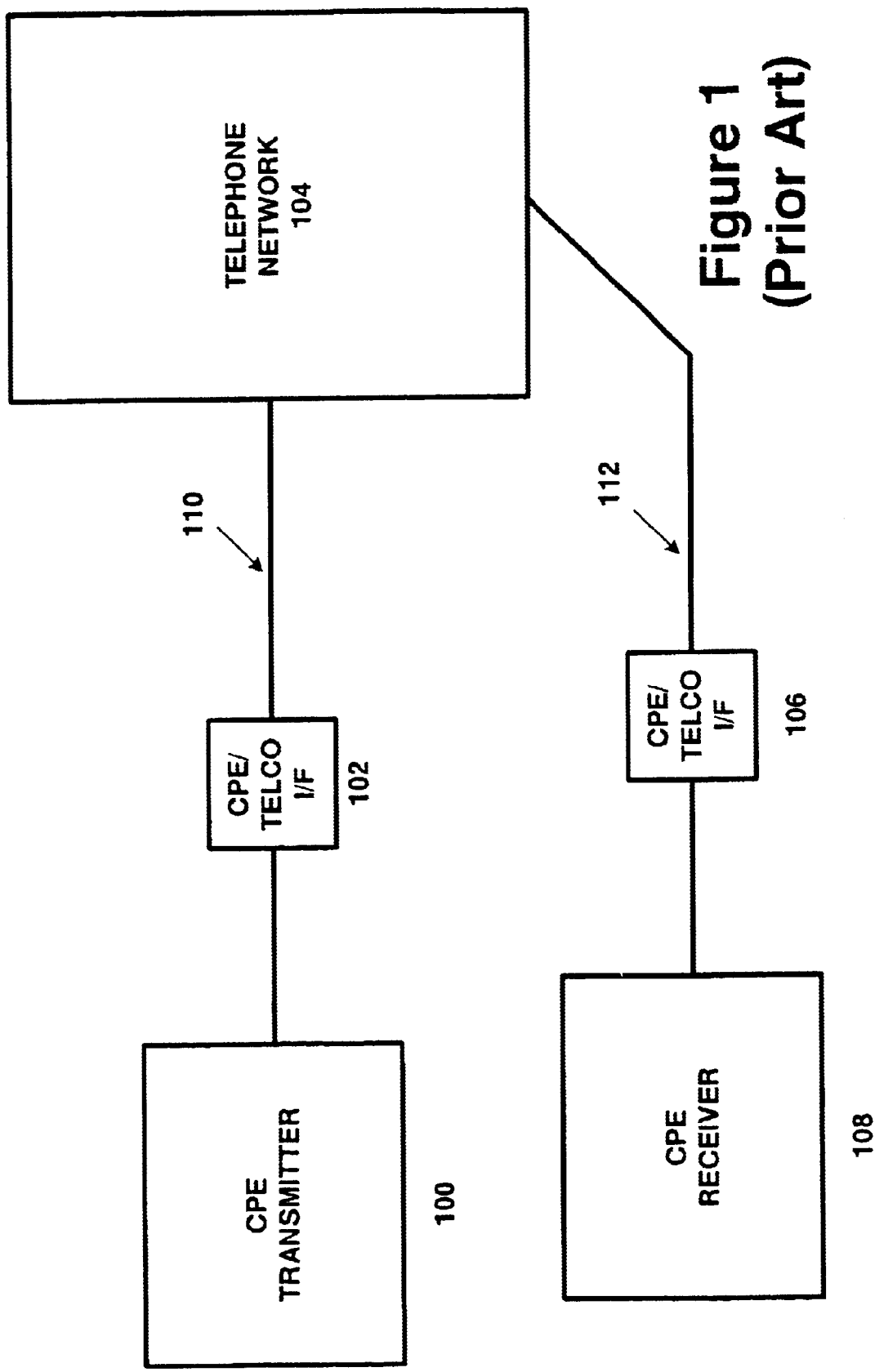
FIG. 1 is a block diagram of a transmitter and a receiver coupled to a Plain Old Telephone Service (POTS) network.

Turning now to the drawings, FIG. 1 is a block diagram of a transmitter and receiver coupled to a telephone network, such as Plain Old Telephone Service (POTS) network of a PSTN. A transmitter 100 is coupled to a Customer Premise Equipment/Telephone Company (CPE/TELCO) interface 102, such as a wall jack (e.g., an RJ-11 jack). The interface 102 generally represents the boundary between the customer and the TELCO. Various CPEs are connected to a TELCO central office switch (CO) (not shown). The CO is then coupled to a telephone network 104. A receiving end is also coupled to the telephone network 104 by its corresponding central office (not shown). An interface representing the boundary of the customer premise and TELCO is represented by an interface 106 which couples the CO and a CPE receiver 108.

The CPE typically include communication devices, such as a modem or a telephone. The CPE typically adheres to interface standards. The interface standards typically provide physical size and electrical loading requirements necessary for the CPE to operate at a defined quality of service. Without the standards, it is possible that a customer premise equipment may not function when coupled to the telephone network, nor perform at optimal levels.

Telephone lines. 110, 112 couple the CPE/TELCO interfaces 102, 106 with the telephone network 104. The telephone lines 110, 112 are generally referred to as a local loop. The telephone lines 110, 112 include tip and ring conductors which have inherent line impedances. As specified in the EIA/TIA-496-A (EIA/TIA) standard, the TELCO provides a DC potential of approximately 48 volts across the tip and ring conductors.

POTS refers to type of service of the PSTN. Access services, such as placing and receiving calls are generally defined by the EIA/TIA standard. When the CPE 100, 108 needs to access the PSTN, the CPE 100,108 goes to an "off-hook" state.

Figure 2:
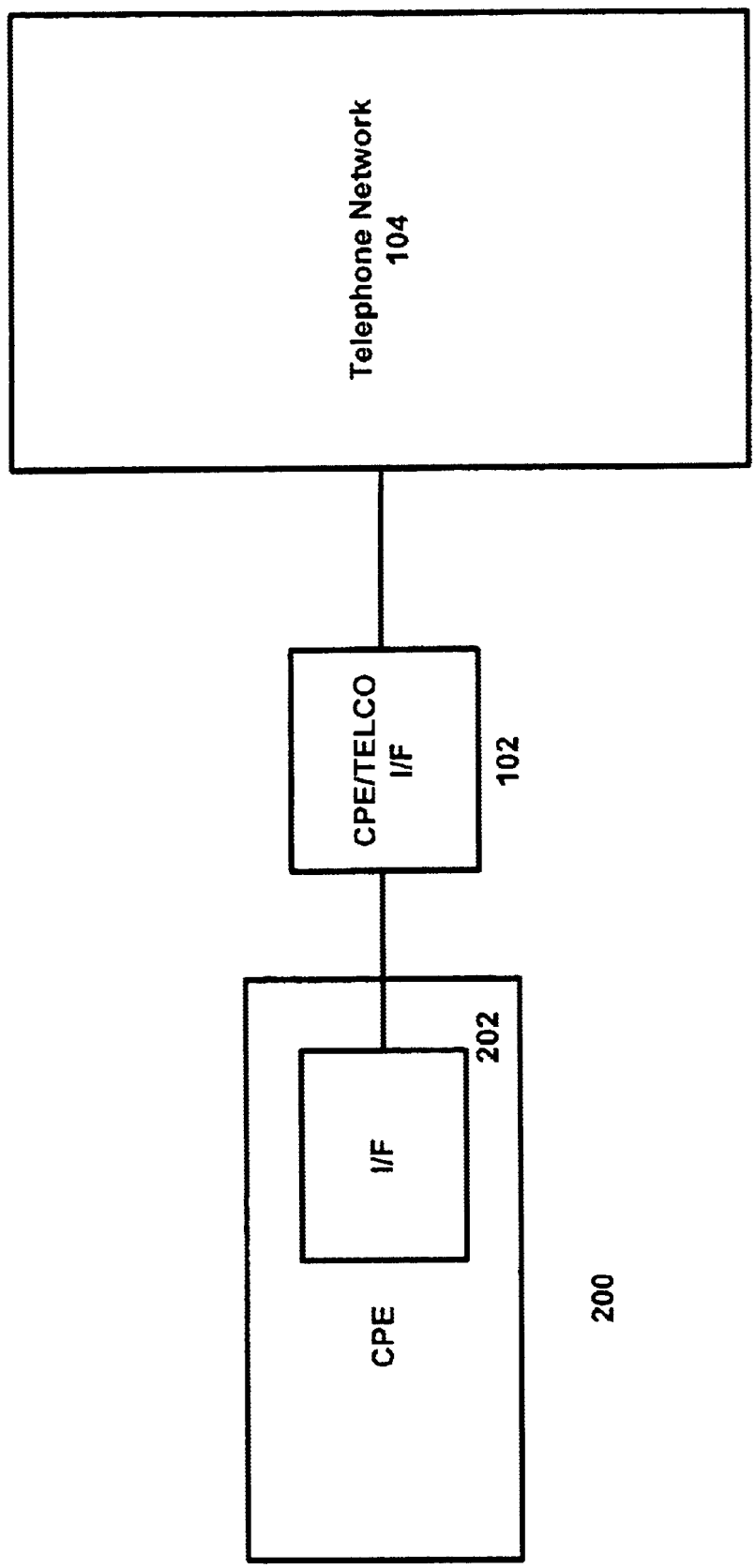
FIG. 2 is a block diagram of a communication system using a POTS interface.

FIG. 2 is a block diagram of a telephone network using a telephone interface. A CPE 200, such as a modem, is coupled to a telephone interface 202. The telephone interface 202 can be incorporated into the CPE 200 or the telephone interface 202 can be a stand-alone device coupled to the CPE 200. An CPE/TELCO interface 102 illustrates the boundary between the customer premises and the telephone company. The CPE/TELCO interface 102 is coupled to a telephone network 104, such as a Plain Old Telephone Service (POTS) network, an x Digital Subscriber Line (xDSL) network, or an Integrated Services Digital Network (ISDN). Depending upon the telephone network 104, the CPE 200 is coupled to the CPE/TELCO interface 102, and typically adheres to a variety of standards, including an electrical interface standard. For example, in the United States, the interface standard is EIA/TIA standard.

The EIA/TIA standard provides electrical requirements for accessing the PSTN. For example, the EIA/TIA standard specifies that it is desirable that a minimum of 40 seconds be allowed at the completion of dialing, before a call is abandoned and retried. Other requirements include a communication device's impedance when the device is on-hook or off-hook. Generally, the PTSN's impedance varies depending on a variety of conditions, such as the CPE/TELCO interface's 102 distance from a Central Office (not shown).

Figure 3:
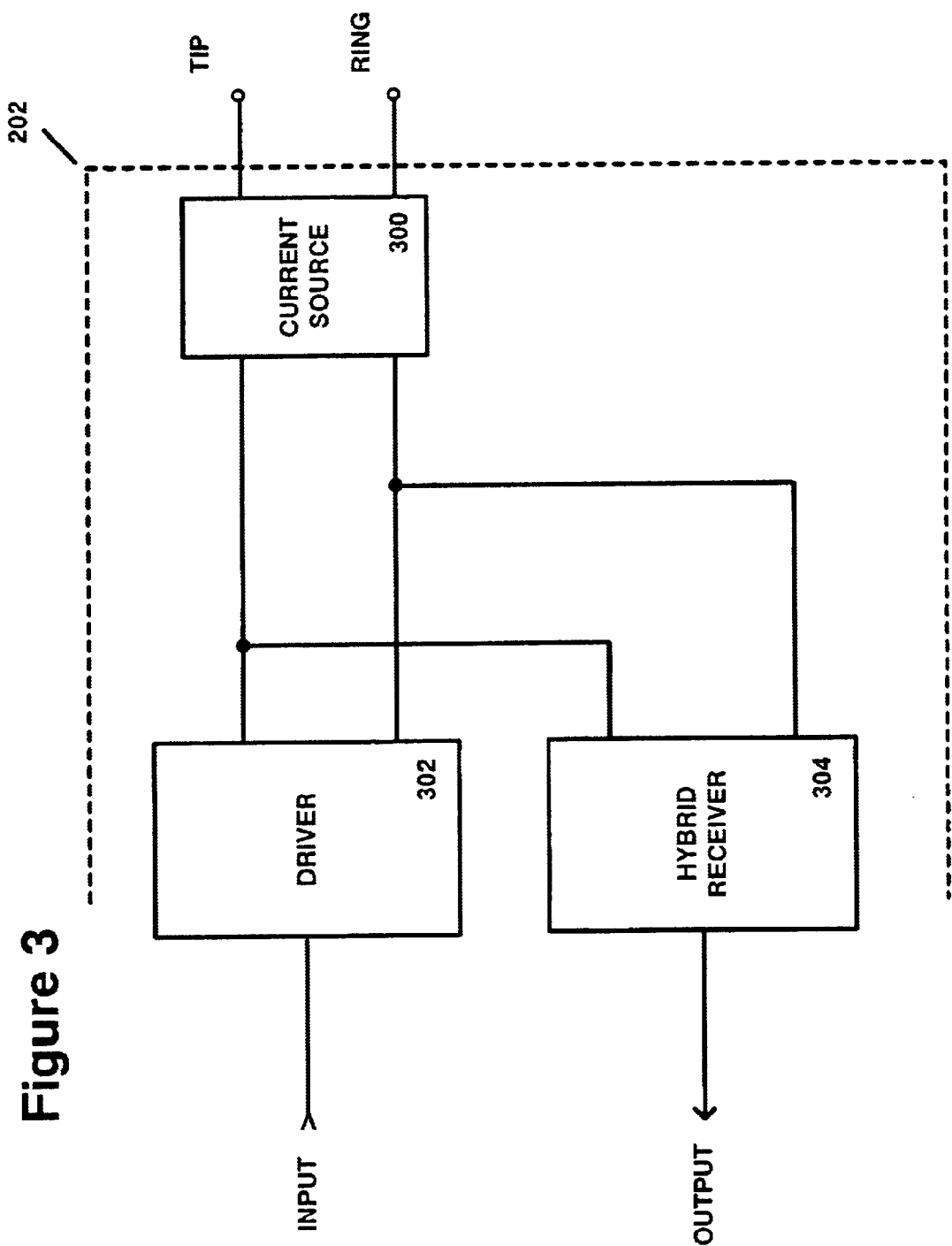
FIG. 3 is a block diagram of a telephone interface.

FIG. 3 is a block diagram of a telephone interface. The universal telephone interface 202 is typically part of an Analog Front End (AFE) of the CPE 200. The telephone interface 202 is coupled to the CPE/TELCO interface (not shown) generally by tip and ring conductors. Although the tip and the ring conductors are shown in the figure, they can be used interchangeable that is, the conductor labeled "tip," could be a "ring" conductor, and the conductor labeled "ring" could be a "tip" conductor. The telephone interface 202 generally includes a driver 302, a current source circuit 300, and a hybrid receiver 304. An INPUT and an OUTPUT are typically coupled to a Coder/Decoder (CODEC) (not shown). The OUTPUT of the CODEC is generally provided to the input of the driver 302. For illustrative purposes, the outputs of the driver 302 are coupled to the current source circuit 300 and the hybrid receiver 304. Typically, part of the output of the driver 302 is provided to the telephone network 104 via tip and ring lines. The hybrid receiver 304 generally provides a rejection of the transmit signals from the driver 302, while providing receive signals from the telephone network 104 to the INPUT of the CODEC. The current source circuit 300 generally provides a constant current for interfacing the CPE 200 when the telephone network 104. As will be discussed further below, the current source circuit 300 can be adjusted automatically depending upon the loading requirements of the telephone network 104. As mentioned previously, the impedance of the telephone network 104 typically varies depending upon conditions of the telephone network 104, such the CPE/TELCO's 102 distance to the CO (not shown).

Figure 4:
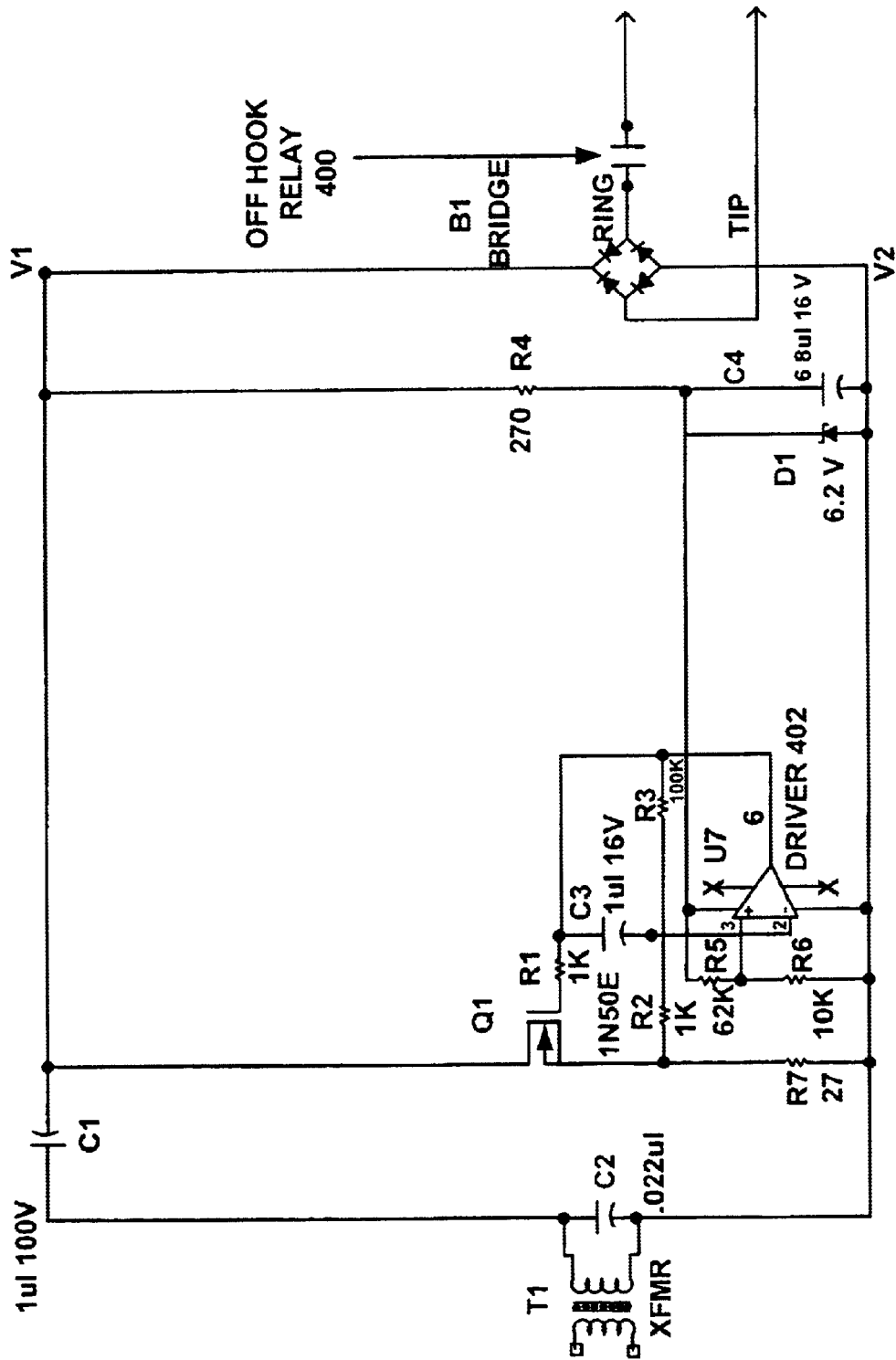
FIG. 4 is a circuit diagram of a telephone interface.

FIG. 4 is a circuit diagram of a constant current source circuit of a telephone interface. The current source circuit 300 is coupled to a transformer TI and a RING and a TIP conductor of the CPE/TELCO I/F 102. An on-hook relay 400 is coupled to the ring conductor of the constant current circuit 300. The off-hook relay 400 closes when the CPE 200 is in a off-hook state and couples the CPE 200 with the telephone network 104. For illustrative purposes, the off-hook relay 400 is coupled to the RING conductor of the current circuit 300. The off-hook relay 400 location is not critical, and can be coupled to the TIP conductor of the current source circuit 300.

A diode bridge B1 is coupled to the off-hook relay 400 and TIP conductor. The diode bridge B1 rectifies the line voltage and provides the appropriate voltage polarity to voltage points V1 and V2, should the TIP and RING conductors be reversed. The voltage point V1 should always be greater than or equal to the voltage at the voltage point V2. Data transmitted over the telephone network 104 is typically represented by the AC component of an electrical signal. A capacitor Cl decouples an DC component of the signal and provides the AC component to the transformer T1. The transformer T1 is coupled to the driver and hybrid receiver (not shown) and typically provides electrical isolation between the CPE 200 and the telephone network 104.

When the CPE 200 goes to an off-hook state, the off-hook relay 400 closes and a voltage appears across a diode bridge B1. A driver 402 is coupled to a 6.2 volt reference diode via resistors RS and R6, which divide the 6.2 volts and provide a 0.86 volt reference to the non inverting input of the driver 402 (when the resistors R5 and R6 are 62 kΩ and 10KΩ respectively). The driver 402 drives its output so that its inverting input is at that same voltage of 0.86 volts by driving a transistor Q1. Thus, the voltage across a resistor R7 is held constant at that 0.86 volts, and when the resistor R7 is selected at 27 Ω, the current through the resistor R7 is constant at approximated 30 mA, which is drawn from the TIP and RING conductors via the bridge B1. Thus, a constant DC biasing current is drawn. Of course, a variety of other constant current sources could be substituted for sinking current.

The function of other circuit components will be apparent, such as a capacitor C3 used with the driver 402 to reduce high frequency response of the system. This allows the constant current source to operate from DC to low frequency AC (direct current or low. frequency AC with no voice or other data) to establish the constant current source, while still allowing the higher frequency voice or modem or other data to pass through the capacitor C1 to the transformer T1.

FIG. 5 is flow chart of a method of providing a constant DC current source. The method starts at step 500. The DC voltage across the TIP and RING conductors of the CPE 200 fluctuate at step 502. A constant DC current is provided to the tip and ring conductor of a transmitter and a receiver of a telephone interface at step 504. The method ends at step 506. As discussed previously, the CPE 200 can typically be used with various telephone networks, where loads may fluctuate. Since the CPE 200 can be dynamically adjusted, the CPE 200 can be coupled to any telephone network 104 without suffering from signal distortion due to DC biasing currents.

Furthermore, certain telephone networks, such as a PBX system, are not current limited systems. In POTS networks, the EIA/TIA standard specifics that the telephone lines be current limited. Thus, if the telephone lines are shorted, a surge of current will not destroy the CPE. However, in a PBX system, typically there is no requirement that the system be current limited. Therefore, without a current source circuit, such as the current source circuit 300, the AFE of the CPE 200 may be damaged by a current surge from such PBX system.

The foregoing disclosure and description of the invention are illustrative and explanatory thereof, and various changes in the size, shape, materials, components, circuit elements, wiring connections and contacts, as well as in the details of the illustrative circuitry and construction and method of operation may be made without departing from the spirit of the invention.

I claim:

1. An apparatus for interfacing customer premise equipment with a telephone network, the apparatus comprising:

an interface within the customer premise equipment that is coupled to the telephone network, the interface comprising a current source, wherein the current source provides a constant current to the customer premise equipment when a line impedance of the telephone network varies in a predetermined range when the customer premise equipment is off-hook;

a tip conductor and a ring conductor, both the tip conductor and the ring conductors are coupled to the interface;

a driver having a non-inverting input, an inverting input and an output;

a divider for dividing a first voltage and providing a second voltage to the non-inverting input; and wherein the driver drives the output, such that the inverting input is at substantially the second voltage.

2. The apparatus of claim 1, wherein the line impedance of the telephone network is defined by an EWTIA-496-A interface standard.

3. The apparatus of claim 1, wherein the telephone network is a Plain Old Telephone System (POTS) network.

4. The apparatus of claim 1, wherein the current source includes a FET.

5. The apparatus of claim 1, wherein the constant current is approximately 30 mA.

6. The apparatus of claim 1, wherein the telephone network is a PBX system.

7. The apparatus of claim 1, further comprising an off-hook relay.

8. The apparatus of claim 1, wherein the current source includes a low pass filter.

9. The apparatus of claim 1, further comprising a reference diode coupled to the driver via the divider, wherein the reference diode provides the first voltage to the divider.

10. The apparatus of claim 1, wherein the divider includes a first resistor and a second resistor.

11. The apparatus of claim 1, further comprising a transistor, wherein the driver drives the transistor.

12. The apparatus of claim 11 further comprising a resistor connected to the transistor, wherein the second voltage is held across the resistor.

13. The apparatus of claim 1, wherein the constant current is drawn from the telephone network.

14. An apparatus at a customer premise that is coupled to a telephone network, the apparatus comprising:

a receiver;

an interface coupled to the receiver and the telephone network, wherein the interface comprises a current source, wherein the current source provides a constant current to the receiver when a line impedance of the telephone network varies in a predetermining range when the customer premise equipment is off-hook;

a tip conductor and a ring conductor; both the tip conductor and the ring conductor are coupled to the interface;

a driver having a non-inverting input, an inverting input and an output;

a divider for dividing a first voltage and providing a second voltage to the non-inverting input; and wherein the driver drives the output, such that the inverting input is at substantially the second voltage.

15. The apparatus of claim 14, wherein the current source includes a FET.

16. The apparatus of claim 14, wherein the telephone network is a Plain Old Telephone Service network.

17. The apparatus of claim 14, wherein the line impedance of the telephone network is defined by an EWTIA-496-A interface standard.

18. The apparatus of claim 14, further comprising a coder/decoder.

19. The apparatus of claim 14, wherein the receiver is a hybrid receiver.

20. The apparatus of claim 14, wherein the telephone network is a PBX system.

21. The apparatus of claim 14, wherein the constant current is approximately 30 mA.

22. The apparatus of claim 14 further comprising a reference diode coupled to the driver via the divider, wherein the reference diode provides the first voltage to the divider.

23. The apparatus of claim 14, wherein the divider includes a first resistor and a second resistor.

24. The apparatus of claim 14 further comprising a transistor, wherein the driver drives the transistor.

25. The apparatus of claim 24 further comprising a resistor connected to the transistor, wherein the second voltage is held across the resistor.

26. The apparatus of claim 14, wherein the constant current is drawn from the telephone network.

27. A method of providing a constant current to an apparatus coupled to a telephone network, the method comprising:

connecting the apparatus at the customer premise to a tip conductor and a ring conductor;

taking the apparatus off-hook;

sinking a constant DC bias current while off-hook, where the DC bias current is independent of a load on the tip conductor and the ring conductor;

dividing a first voltage to generate a second voltage;

providing the second voltage to a non-inverting input of a driver; and driving the output of the driver, such that an inverting input of the driver is at substantially the second voltage.

28. The method of claim 27, wherein the telephone network is a Plain Old Telephone Service (POTS) network.

29. The method of claim 27, wherein the telephone network is a PBX System.

30. The method of claim 27, wherein the DC bias current is approximately 30 mA.

31. The method of claim 27 further comprising: drawing the constant current is drawn from the telephone network.

32. A method of providing a constant current to an apparatus coupled to a telephone network via a tip conductor and a ring conductor and placed off-hook, the method comprising:

sinking a constant DC bias current while said apparatus is off-hook, where the DC bias current is independent of a load on the tip conductor and the ring conductor;

dividing a first voltage to generate a second voltage;

providing the second voltage to a non-inverting input of a driver; and driving the output of the driver, such that an inverting input of the driver is at substantially the second voltage.

33. The method of claim 32, wherein the telephone network is a Plain Old Telephone Service (POTS) network.

34. The method of claim 32, wherein the telephone network is a PBX System.

35. The method of claim 32, wherein the DC bias current is approximately 30 mA.

36. The method of claim 32, further comprising: drawing the constant current is drawn from the telephone network.

* * * * *